(12) United States Patent
Loehr et al.

(10) Patent No.: US 10,785,670 B2
(45) Date of Patent: Sep. 22, 2020

(54) PACKET DATA CONVERGE PROTOCOL PROTOCOL DATA UNIT PRE-PROCESSING

(71) Applicant: Motorola Mobility LLC, Chicago, IL (US)

(72) Inventors: Joachim Loehr, Wiesbaden (DE); Prateek Basu Mallick, Langen (DE); Ravi Kuchibhotla, Clarendon Hills, IL (US)

(73) Assignee: Motorola Mobility LLC, Chicago, IL (US)

( * ) Notice: Subject to any disclaimer, the term of this patent is extended or adjusted under 35 U.S.C. 154(b) by 48 days.

(21) Appl. No.: 15/498,314

(22) Filed: Apr. 26, 2017

(65) Prior Publication Data

US 2018/0317115 A1    Nov. 1, 2018

(51) Int. Cl.
*H04W 28/02* (2009.01)
*H04W 72/14* (2009.01)
*H04L 29/08* (2006.01)
*H04W 28/08* (2009.01)
*H04W 28/06* (2009.01)

(52) U.S. Cl.
CPC ....... *H04W 28/0205* (2013.01); *H04L 69/324* (2013.01); *H04W 28/0252* (2013.01); *H04W 28/065* (2013.01); *H04W 28/085* (2013.01); *H04W 72/14* (2013.01)

(58) Field of Classification Search
CPC ......... H04W 28/0205; H04W 28/0252; H04W 72/14; H04L 69/324
See application file for complete search history.

(56) References Cited

U.S. PATENT DOCUMENTS

| 2006/0098574 A1* | 5/2006 | Yi | H04L 1/1877 370/236 |
| 2008/0031253 A1* | 2/2008 | Kim | H04L 1/0045 370/393 |
| 2012/0195273 A1* | 8/2012 | Iwamura | H04W 72/1252 370/329 |
| 2013/0010688 A1* | 1/2013 | Yi | H04L 1/1829 370/328 |
| 2015/0289165 A1* | 10/2015 | Reider | H04W 28/0289 370/236 |
| 2016/0337909 A1* | 11/2016 | Cai | H04W 36/0033 |
| 2016/0345198 A1* | 11/2016 | Lee | H04L 69/28 |
| 2017/0142770 A1* | 5/2017 | Fu | H04L 1/1614 |

(Continued)

FOREIGN PATENT DOCUMENTS

WO    2010017467 A1    2/2011

OTHER PUBLICATIONS

Ericsson, "UL Split in Dual Connectivity", 3GPP TSG-RAN WG2 #97bis, Tdoc R2-1702749, Apr. 3-7, 2017, pp. 1-4.

(Continued)

*Primary Examiner* — Shukri Taha
(74) *Attorney, Agent, or Firm* — Kunzler Bean & Adamson (57) ABSTRACT

For pre-processing Packet Data Converge Protocol (PDCP) Protocol Data Units (PDU), a method receives a configuration of a reference uplink grant. In response to receiving the configuration of the reference uplink grant, the method calculates a preprocessing threshold of PDU for preprocessing by a Radio Link Control (RLC)/Medium Access Control (MAC) for each of one or more radio bearers.

11 Claims, 10 Drawing Sheets

(56) References Cited

U.S. PATENT DOCUMENTS

2017/0237837 A1* 8/2017 Sammour ............. H04L 1/1874
 370/465
2018/0124843 A1* 5/2018 Shaheen ............... H04W 76/11
2018/0139646 A1* 5/2018 Basu Mallick ..... H04W 28/085

OTHER PUBLICATIONS

PCT/US2018/029595, "Notification of Transmittal of the International Search Report and the Written Opinion of the International Searching Authority, or the Declaration", Jul. 26, 2018, pp. 1-12.

* cited by examiner

| Transmission Data Size
210 |
|---|
| Split Bearer Configuration Indicator
215 |
| Data Split Threshold
220 |
| Preprocessing Threshold
225 |
| Routing Mode
230 |
| Duplicate PDU Definition
235 |

FIG. 2A

PDU
250

Reference Uplink Grant
275

PACKET DATA CONVERGE PROTOCOL PROTOCOL DATA UNIT PRE-PROCESSING

FIELD

The subject matter disclosed herein relates to pre-processing Packet Data Converge Protocol (PDCP) Protocol Data Units (PDU).

BACKGROUND

Description of the Related Art

A mobile device may process data for transmission.

BRIEF SUMMARY

A method for pre-processing PDCP PDU is disclosed. The method receives a configuration of a reference uplink grant. In response to receiving the configuration of the reference uplink grant, the method calculates a preprocessing threshold of PDU for preprocessing by a Radio Link Control (RLC)/Medium Access Control (MAC) for each of one or more radio bearers. An apparatus and program product also perform the method.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1A:
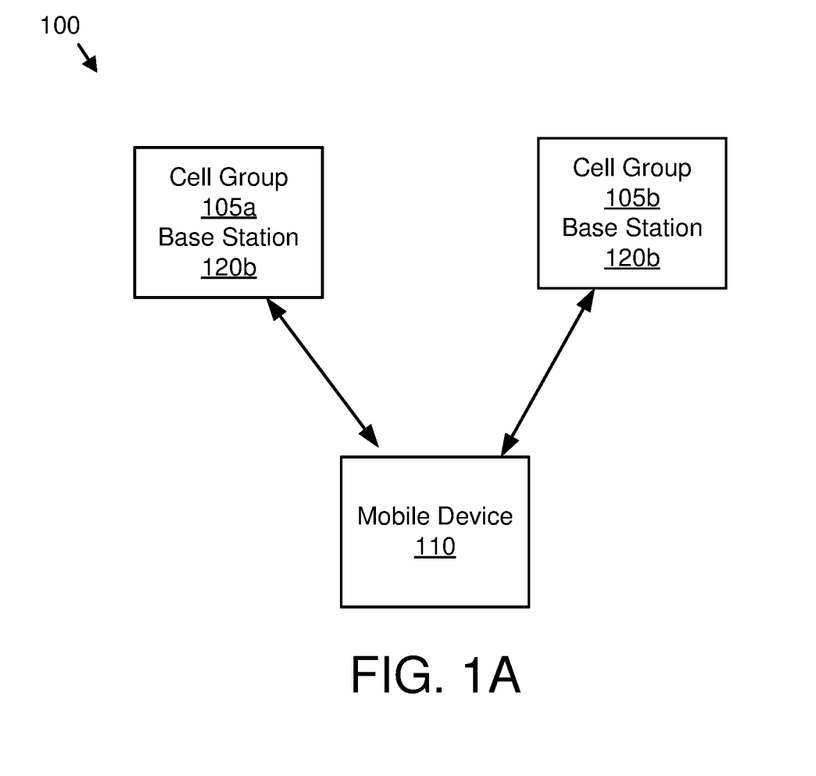
FIG. 1A is a schematic block diagram illustrating one embodiment of a communication system.

FIG. 1A is a schematic block diagram illustrating one embodiment of a communication system 100. The system 100 includes one or more base stations 120 and a mobile device 110. The mobile device 110 may communicate with the base stations 120 on the cells of a cell groups 105 associated with the base stations 120. The cell groups 105 may be associated with a gNodeB (gNB) base station 120, i.e. New Radio (NR) base station 120, or an enhanced evolved node B (eNB) Long Term Evolution (LTE) base station 120. In one embodiment, a first cell group 105a may be associated with a Master Node and a second cell group 105b may be associated with a Secondary Node. The group of the serving cells associated with the Master Node may be a Master Cell Group (MCG), the group of serving cells associated with the Secondary Node may be a Secondary Cell Group (SCG). The mobile device 110 may be a mobile telephone, a machine-type communications (MTC) device, a tablet computer, a laptop computer, and embedded communication devices in automobiles, kiosks, appliances, and the like.

The system 100 may be designed for high data transmission rates and low latency. As a result, it may be advantageous to preprocess PDU in various layers to speed data transmission. In one embodiment, the mobile device 110 is in communication with the first cell group/first node 105*a*. In addition, the mobile device 110 may be in communication with the second cell group (SCG)/second node 105*b*. To increase data transmission to the cell groups 105, the mobile device 110 may preprocess PDU for transmission to the base stations 120. Unfortunately, superfluous PDU may be generated and transmitted, reducing the efficiency of the mobile device 110. The embodiments described herein limit the preprocessing of PDU to reduce inefficiencies as will be described hereafter.

Figure 1B:
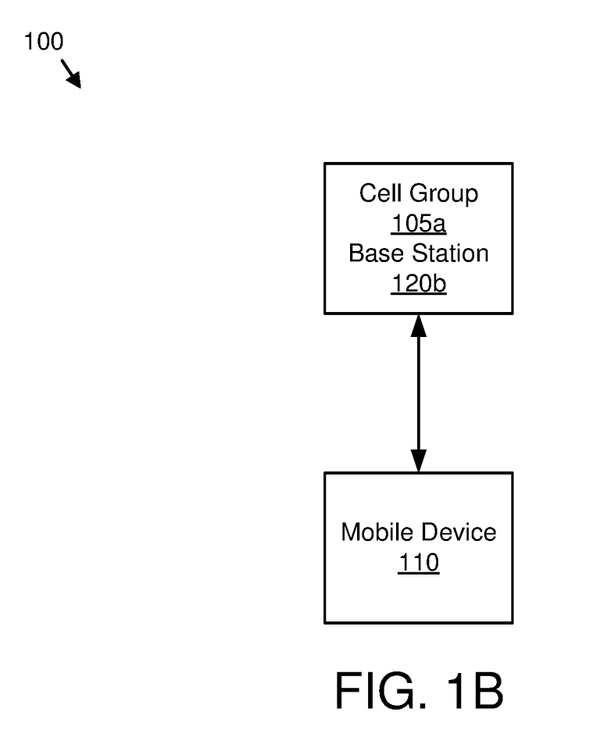
FIG. 1B is a schematic block diagram illustrating one alternate embodiment of a communication system.

FIG. 1B is a schematic block diagram illustrating one alternate embodiment of the communication system 100. In the depicted embodiment, the system 100 includes one base station 120 in communication with the mobile device 110.

Figure 2A:
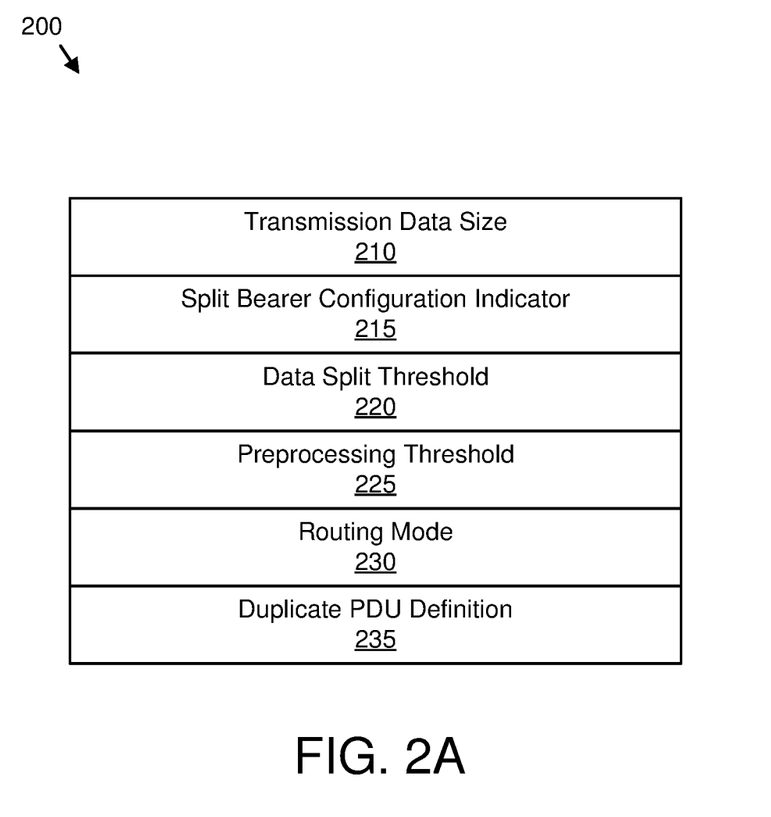
FIG. 2A is a schematic block diagram illustrating one embodiment of split bearer data.

FIG. 2A is a schematic block diagram illustrating one embodiment of transmission data 200. The transmission data 200 maybe organized as a data structure in a memory. In the depicted embodiment, the transmission data 200 includes a transmission data size 210, a split bearer configuration indicator 215, a data split threshold 220, a preprocessing threshold 225, a routing mode 230, and a duplicate PDU definition 235.

The transmission data size 210 may record the quantity of data that is available for transmission from the mobile device 110 to the cell groups 105. The transmission data size 210 may be measured in bytes, kilobytes, megabytes, and the like.

The split bearer configuration indicator 215 may indicate that the mobile device 110 is configured for split bearer data transmission to two or more cell groups 105. The data split threshold 220 may indicate a quantity of data that if exceeded, may cause the mobile device 110 to communicate the data in a split bearer transmission. In one embodiment, the data split threshold 220 is a number of Packet Data Converge Protocol (PDCP) PDU.

The preprocessing threshold 225 may specify a maximum quantity of PDCP data that are pre-processed. The preprocessing threshold 275 may be calculated based on a reference uplink grant as will be described hereafter.

The routing mode 230 may specify a PDU routing method for split bearer transmission. The duplicate PDU definition 235 may specify the contents of a duplicate PDU. In one embodiment, the duplicate PDU definition 235 specifies that a duplicate PDU be transmitted as an empty PDU that includes only a header and does not include data.

Figure 2B:
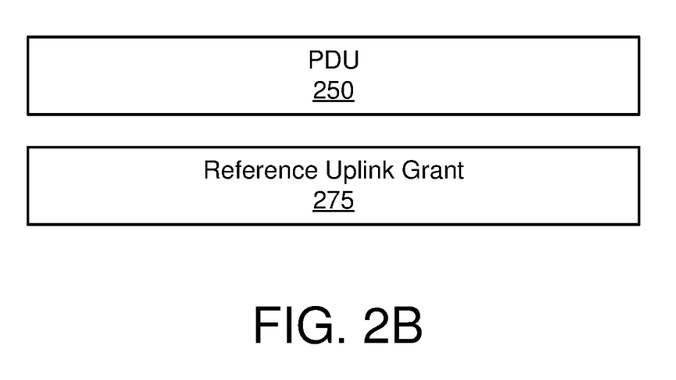
FIG. 2B is a schematic block diagram illustrating one embodiment of communication data.

FIG. 2B is a schematic block diagram illustrating one embodiment of communication data. The communication data maybe organized as a data structure in memory and/or wirelessly transmitted. In the depicted embodiment, the communication data includes a PDU 250 and a reference uplink grant 275. In one embodiment, the reference uplink grant 275 is configured to the mobile device 110. The preprocessing threshold 225 may be calculated from the reference uplink grant 275.

Figure 3A:
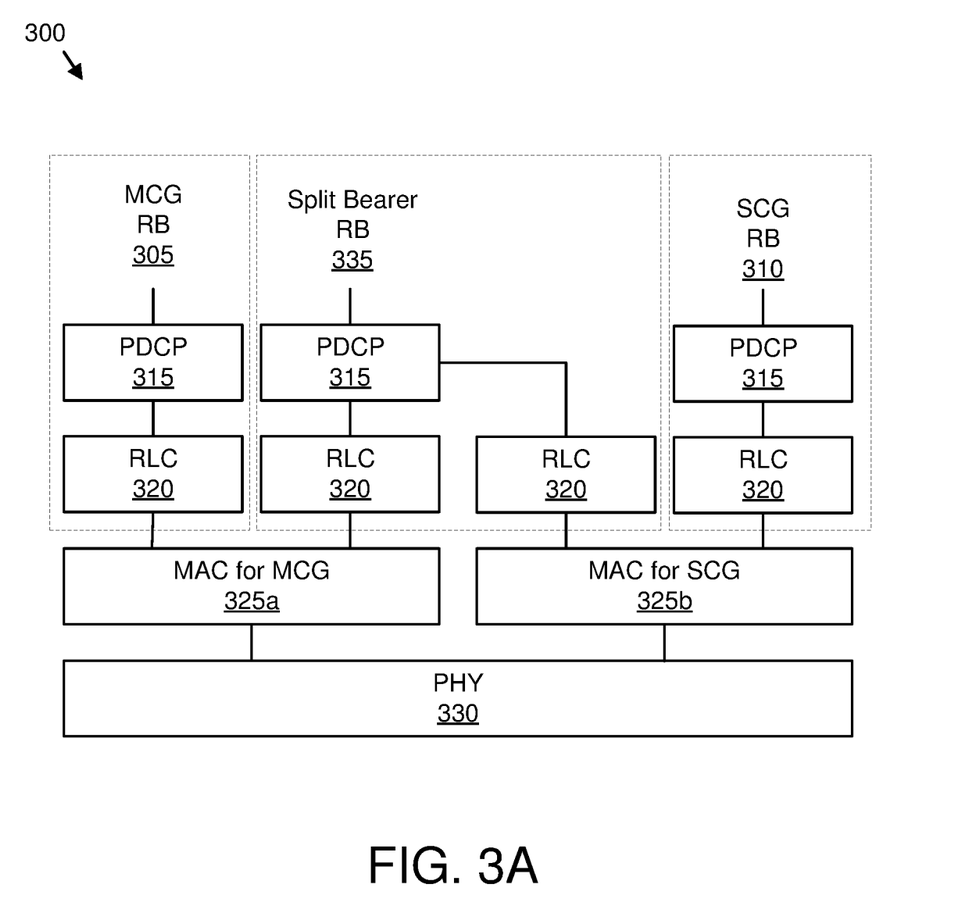
FIG. 3A is a schematic block diagram illustrating one embodiment of mobile device transmission layers.

FIG. 3A is a schematic block diagram illustrating one embodiment of mobile device transmission layers 300. The mobile device transmission layers 300 maybe organized as a combination of data structures, registers, and semiconductor hardware. In the depicted embodiment, the layers 300 include a PDCP 315, a Radio Link Control (RLC) 320, a MAC for MCG 325*a*, a MAC for SCG 325*b*, and a physical (PHY) 325 layers. A plurality of PDCP 315 and RLC 320 may be distributed between an MCG Radio Bearer (RB) 305, a split bearer RB 335, and an SCG RB 310.

A PDCP 315 may generate one or more PDU from data that is to be transmitted from the mobile device 110 to the cell groups 105. The RLC 320 and MAC 325 may generate PDU 250 from the PDCP PDU. The PHY 330 may transmit the PDU 250 to a cell group respectively the associated node 105. Data may be communicated via one of the radio bearer, MCG RB 305, split bearer RB 335, and SCG RB 310 as will be described hereafter.

When the RLC 320 and MAC 325 are preprocessing a significant number of PDCP PDU 250, RLC/MAC Packet Data Unit (SDU) may be pre-constructed in the RLC/MAC 325 with an RLC/MAC header. However, if too many PDU 250 are preprocessed and PDCP SDU are required to be discarded, e.g., due to expiry of the PDCP discard timer, the transmission efficiency of the mobile device 110 is degraded since preprocessed PDCP SDUs, e.g., already formed into RLC PDUs, cannot be removed from the transmission queue and will be transmitted. The embodiments limit the number of preprocessed PDU 250 thereby ensuring that the discard functionality is effective.

In addition, in the case of a split bearer transmission, the mobile device 110 does not know which cell group 105 to begin transmitting data to until an uplink grant is received. As a result, the RLC 320/MAC 325 does not know which cell group 105 PDU 250 should be pre-processed for. The embodiments reduce and/or eliminate the number of PDU 250 that are preprocessed prior to receiving an uplink grant.

Figure 3B:
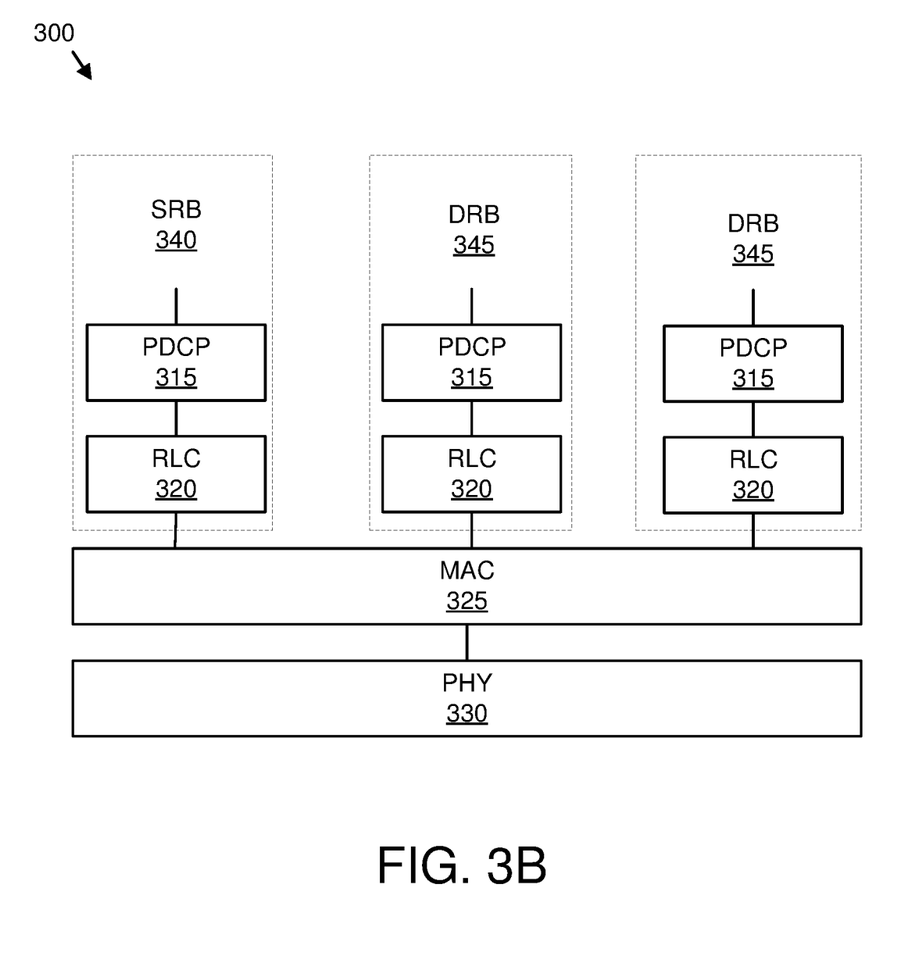
FIG. 3B is a schematic block diagram illustrating one alternate embodiment of mobile device transmission layers.

FIG. 3B is a schematic block diagram illustrating one alternate embodiment of mobile device transmission layers 300. In the depicted embodiment, the layers 300 include a signaling radio bearer (SRB) 340 and one or more DRB 345. Each of the SRB 340 and the DRB 345 may include a PDCP 315 and RLC 320 in communication with a MAC 325.

Figure 4:
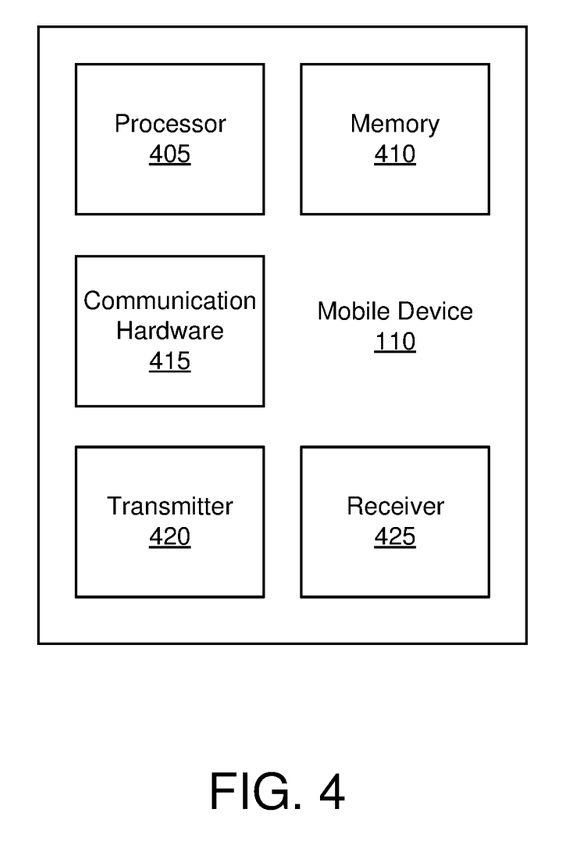
FIG. 4 is a schematic block diagram illustrating one embodiment of a mobile device.

FIG. 4 is a schematic block diagram illustrating one embodiment of a transceiver 400. The transceiver 400 may be the mobile device 110. Alternatively, the transceiver 400 may be the cell group 105. In the depicted embodiment, the transceiver 400 includes a processor 405, a memory 410, communication hardware 415, a transmitter 420, and a receiver 425. The memory 410 may be a semiconductor storage device, an optical storage device, micromechanical storage device, a magnetic storage device, or combinations thereof. The memory 410 may store code. The processor 405 may execute the code. The communication hardware 415 may direct data within the mobile device 110. The transmitter 420 may transmit PDU 250 to a cell group 105 and/or mobile device 110. The receiver 425 may receive PDU 250 from a cell group 105 and/or mobile device 110.

Figure 5A:
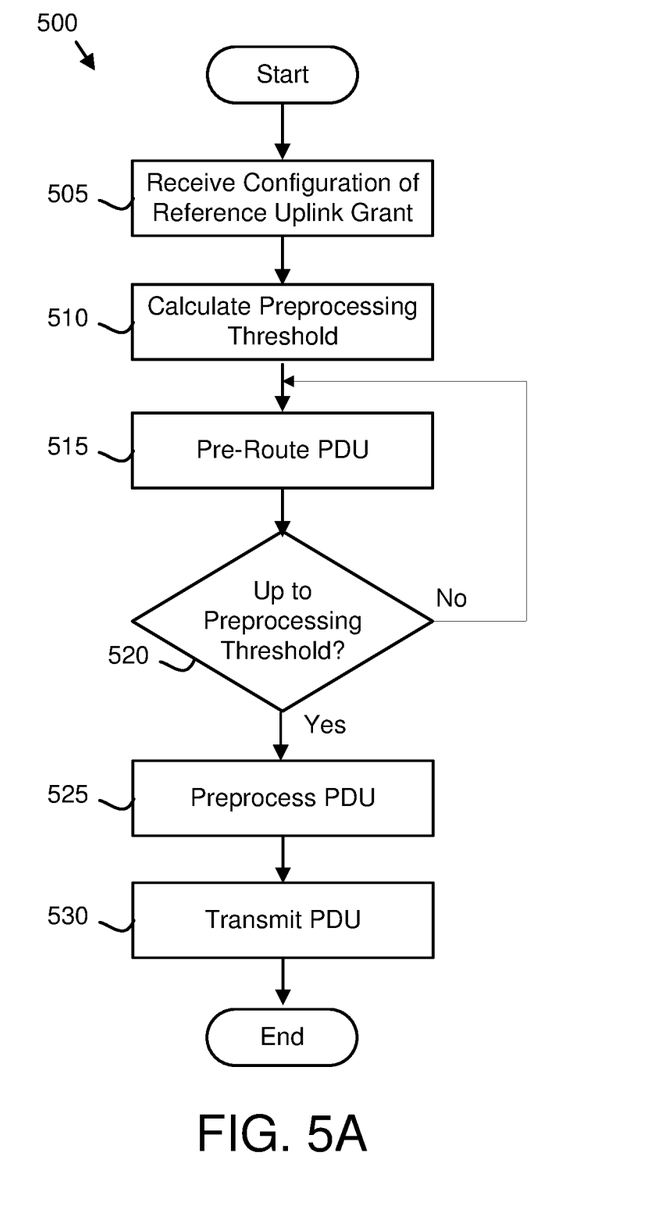
FIG. 5A is a schematic flow chart diagram illustrating one embodiment of a PDU pre-processing method.

FIG. 5A is a schematic flow chart diagram illustrating one embodiment of a PDU preprocessing method 500. The method 500 may pre-process PDU 250. The method 500 may be performed by the mobile device 110 and/or the processor 405 of the mobile device 110.

The method 500 starts, and in one embodiment, the processor 405 receives 505 a configuration of the reference uplink grant 275. The reference uplink grant 275 may be signaled from the base station 120. In one embodiment the reference uplink grant is signaled to the processor 405 during the initial attach procedure. The base station 120 may update the reference uplink grant 275. In one embodiment, the base station 120 may update the reference uplink grant 275 by using a radio resource control procedure such as a RRC reconfiguration procedure. In certain embodiments, the reference uplink grant 275 is hardcoded in the specification.

The reference uplink grant 275 determines the amount of data in bits or bytes or the like, e.g., transport block size and the like that the processor 405 may be capable of generating and transmitting on the uplink within a defined processing time when an uplink grant is received from a base station 120. In one embodiment, the reference uplink grant 275 is determined as the maximum expected uplink (UL) grant size considering the mobile device capabilities. The mobile device capabilities may include Multiple Input Multiple Output (MIMO) capabilities, supported numerologies, and the like as well as restrictions on the network side, e.g., maximum bandwidth, and the like.

The processor 405 may calculate 510, based on the reference uplink grant, the required amount of preprocessing for the one or more configured radio bearer 305/335/340/345 which is necessary in order to generate the transport block according to the reference uplink grant. The processor 405 may calculate 510 the preprocessing threshold 225 of PDU 250 for preprocessing PDU 250 by the RLC 320/MAC 325 for each of one or more configured radio bearers 305/335/340/345. The processor 405 shall preprocess data for only one potential uplink transmission. The processor 405 may calculate 510 the preprocessing threshold 225 for the configured one or multiple configured radio bearer 305/335/340/345 by performing the logical channel prioritization (LCP) procedure with the UL reference grant as input.

The processor 405 may pre-route 515 PDU 250 to one or more RLC 320/MAC 325. The processor 405 may determine 520 if the number of PDU 250 that are pre-routed 515 to the RLC 320/MAC 325 is not up to the pre-routing threshold 225. If the number of PDU 250 is not up to the pre-routing threshold 225, the processor 405 may continue to pre-route 515 PDU 250.

The PDU 250 may be pre-routed 515 to two or more cell groups 105 in response to detecting a split bearer configuration indicated by the split bearer configuration indicator 215 and determining that the data to be transmitted exceeds the data split threshold 220. Alternatively, the PDU 250 may be pre-routed 515 to a single cell group 105 in response to detecting no split bearer configuration. In one embodiment, the PDU 250 are pre-routed 515 to a single cell group 105 in response to detecting the split bearer configuration and determining that the data to be transmit does not exceed the data split threshold 220.

If the number of PDU 250 that are pre-routed is up to the preprocessing threshold 225, the RLC 320/MAC 325 may preprocess 525 the PDU 250 for transmission and the method 500 ends.

Figure 5B:
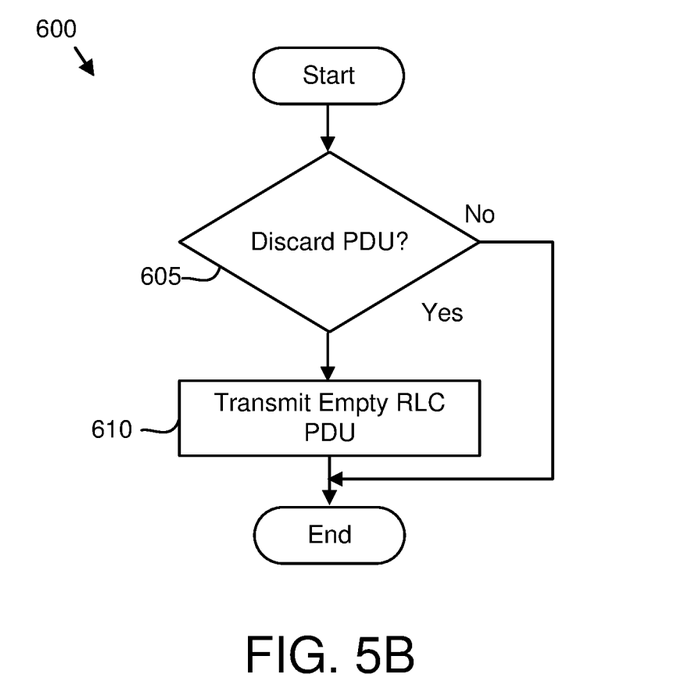
FIG. 5B is a schematic flow chart diagram illustrating one embodiment of a PDU discard method.

FIG. 5B is a schematic flow chart diagram illustrating one embodiment of a PDU discard method 600. The method 600 may discard PDU 250 that were preprocessed for transmission. The method 600 may be performed by the mobile device 110 and/or the processor 405 of the mobile device 110.

The method 600 starts, and in one embodiment, the processor 405 determines 605 to discard a first PDCP PDU 250. The processor 405 may determine 605 to discard the first PDCP PDU 250 based on expiry of PDCP discard timer. The first PDCP PDU 250 may be assigned an RLC header and formed to an RLC PDU 250. In response to determining 605 to discard the first PDU 250, the PDU 250 may be transmitted 610 as an empty RLC PDU 250 and the method 600 ends. The empty RLC PDU 250 may include some indication that there is no data payload in the RCL PDU 250. In one embodiment, the RLC PDU 250 contains only header information.

Figure 5C:
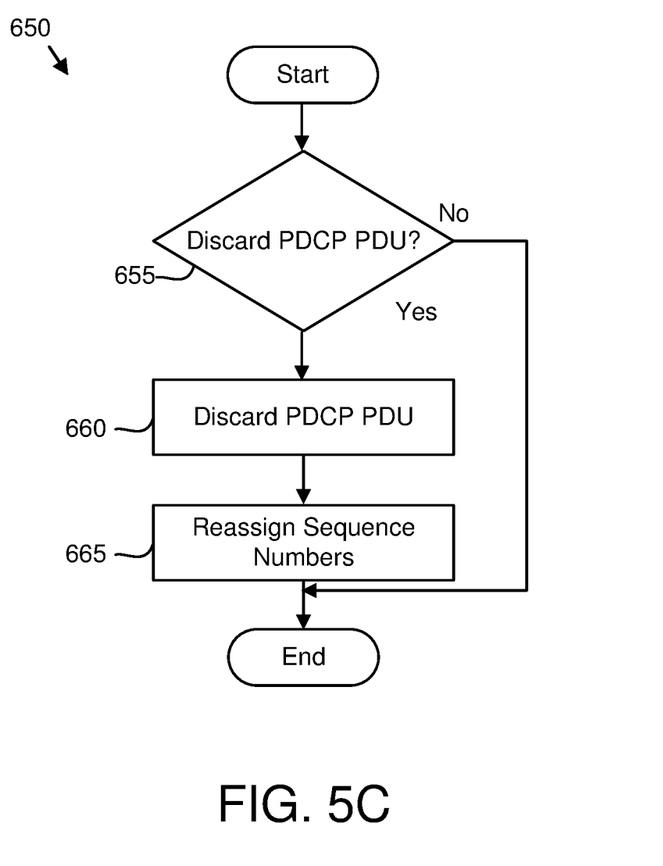
FIG. 5C is a schematic flow chart diagram illustrating one alternate embodiment of a PDU discard method.

FIG. 5C is a schematic flow chart diagram illustrating one alternate embodiment of a PDU discard method 650. The method 650 may discard PDU 250 that were preprocessed for transmission. The method 650 may be performed by the mobile device 110 and/or the processor 405 of the mobile device 110.

The method 650 starts, and in one embodiment, the processor 405 determines 655 to discard a first PDCP PDU 250. The determination 665 to discard the first PDCP PDU 250 may be based on expiry of PDCP discard timer. The first PDCP PDU 250 may be assigned an RLC header and formed to an RLC PDU. In response to determining 605 to discard the first PDU 250, the processor 405 may discard 660 the first PDCP PDU 250. In addition, the processor 405 may reassign 665 sequence numbers for subsequent RLC PDU 250 and the method 650 ends The embodiments use a configured reference uplink grant 275 and calculate the preprocessing threshold 275 for preprocessing PDU 250. In addition, the embodiments may only pre-route PDU 250 up to the preprocessing threshold 225. As a result, a processing power friendly implementation for the transmitter 420 in the mobile device 110 is ensured while PDCP discard functionality is still effective. Further embodiments discard PDCP PDUs 250 even though the PDCP PDU 250 has been formed into a RLC PDU 250 with a sequence number. As a result, the mobile device 110 does not transmit the discarded PDCP PDU 250, increasing the efficiency of transmission.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
routing, by use of a processor, Radio Link Control (RLC) Service Data Units (SDUs) of a radio bearer from the PDCP entity to the Radio Link Control (RLC) entity;
generating a RLC header for each of the RLC SDU and generating RLC Protocol Data Units (PDU);
storing the generated RLC PDUs for transmission in the RLC entity;
receiving a notification from the PDCP entity to discard a first RLC SDU that is formed to a RLC PDU and pending for transmission, wherein the RLC PDUs are generated and stored for transmission in the RLC entity to at least two cell groups in response to a split bearer configuration or to a single cell group in response to no split bearer configuration;
discarding the first RLC SDU at the RLC entity in response to the RLC SDU not being submitted to a Medium Access Control (MAC) entity;
reassigning a sequence number for subsequent RLC PDUs pending in the RLC entity for initial transmission after the first RLC SDU at the RLC entity; and
submitting the first RLC SDU to the MAC entity in response to receiving no notification from the PDCP entity to discard the first RLC SDU.

2. The method of claim 1, the method further comprising:
determining to discard a first PDCP PDU that is assigned an RLC header; and
transmitting the first PDU as an empty RLC PDU.

3. The method of claim 1, wherein the PDU are pre-routed to the at least two cell groups in response to detecting a split bearer configuration and determining that the data exceeds a data split threshold.

4. The method of claim 1, wherein the PDU are pre-routed to a single cell group in response to detecting a split bearer configuration and determining that the data does not exceed a data split threshold.

5. An apparatus comprising:
a processor performing:
routing Radio Link Control (RLC) Service Data Units (SDUs) of a radio bearer from the PDCP entity to the Radio Link Control (RLC) entity;
generating a RLC header for each of the RLC SDU and generating RLC Protocol Data Units (PDU);
storing the generated RLC PDUs for transmission in the RLC entity;
receiving a notification from the PDCP entity to discard a first RLC SDU that is formed to a RLC PDU and pending for initial transmission, wherein the RLC PDUs are generated and stored for transmission in the RLC entity to at least two cell groups in response to a split bearer configuration or to a single cell group in response to no split bearer configuration;
discarding the first RLC SDU at the RLC entity in response to the RLC SDU not being submitted to a Medium Access Control (MAC) entity;
reassigning a sequence number for subsequent RLC PDUs pending in the RLC entity for initial transmission after the first RLC SDU at the RLC entity; and
submitting the first RLC SDU to the MAC entity in response to receiving no notification from the PDCP entity to discard the first RLC SDU.

6. The apparatus of claim 5, the processor further performing:
determining to discard a first PDCP PDU that is assigned an RLC header; and
transmitting the first PDU as an empty RLC PDU.

7. The apparatus of claim 5, wherein the PDU are pre-routed to the at least cell groups in response to detecting a split bearer configuration and determining that the data exceeds a data split threshold.

8. The apparatus of claim 5, wherein the PDU are pre-routed to a single cell group in response to detecting a split bearer configuration and determining that the data does not exceed a data split threshold.

9. A program product comprising a non-transitory computer readable storage medium that stores code executable by a processor, the executable code comprising code to perform:
routing Radio Link Control (RLC) Service Data Units (SDUs) of a radio bearer from the PDCP entity to the Radio Link Control (RLC) entity;
generating a RLC header for each of the RLC SDU and generating RLC Protocol Data Units (PDU);
storing the generated RLC PDUs for transmission in the RLC entity;
receiving a notification from the PDCP entity to discard a first RLC SDU that is formed to a RLC PDU and pending for initial transmission, wherein the RLC PDUs are generated and stored for transmission in the RLC entity to at least two cell groups in response to a split bearer configuration or to a single cell group in response to no split bearer configuration;
discarding the first RLC SDU at the RLC entity in response to the RLC SDU not being submitted to a Medium Access Control (MAC) entity;
reassigning a sequence number for subsequent RLC PDUs pending in the RLC entity for initial transmission after the first RLC SDU at the RLC entity, and
submitting the first RLC SDC to the MAC entity in response to receiving no notification from the PDCP entity to discard the first RLC SDU.

10. The program product of claim 9, the executable code further performing:
determining to discard a first PDCP PDU that is assigned an RLC header; and
transmitting the first PDU as an empty RLC PDU.

11. The program product of claim 9, wherein the PDU are pre-routed to the at least two cell groups in response to detecting a split bearer configuration and determining that the data exceeds a data split threshold.

\* \* \* \* \*